United States Patent [19]
Mochizuki et al.

[11] Patent Number: 6,122,249

[45] Date of Patent: *Sep. 19, 2000

[54] ADD-DROP MULTIPLEXING APPARATUS

[75] Inventors: Hideaki Mochizuki; Ritsuko Ohkura, both of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/810,406

[22] Filed: Mar. 4, 1997

[30] Foreign Application Priority Data

Mar. 6, 1996 [JP] Japan .................................. 8-048570

[51] Int. Cl.[7] .................................. H04L 1/22; H04J 3/14
[52] U.S. Cl. .................... 370/220; 370/224; 370/258; 370/535; 340/826; 714/717
[58] Field of Search .................................. 370/216, 217, 370/218, 219, 220, 221, 222, 223, 224, 244, 248, 254, 257, 258, 360, 535; 340/825.03, 826, 827, 825.05, 825.16, 825.17; 359/110, 118, 119; 714/712, 717, 1, 2, 3, 4

[56] References Cited

U.S. PATENT DOCUMENTS 5,179,548  1/1993  Sandesara .............................. 370/406
5,311,501  5/1994  Takatsu .................................. 370/535
5,343,464  8/1994  Iino et al. .............................. 370/535
5,412,652  5/1995  Lu ......................................... 370/223
5,442,623  8/1995  Wu ........................................ 370/224
5,572,513  11/1996 Yamamoto et al. .................... 370/217
5,757,768  5/1998  Goto et al. ............................ 370/222
5,757,774  5/1998  Oka ....................................... 370/224
5,790,520  8/1998  Iwamoto et al. ...................... 370/223

*Primary Examiner*—Alpus H. Hsu
*Attorney, Agent, or Firm*—Helfgott & Karas, PC.

[57] ABSTRACT

An add drop multiplexing (ADM) apparatus has a simple and compact structure. The ADM apparatus has high-order interfaces connected to a high-order network, path setting units each for setting a path for a signal according to path data and inserting or dropping the signal to or from the high-order network, a first path protection switch for selecting one of the signals dropped by the path setting units, low-order interfaces each for receiving the selected signal and transmitting the same to a low-order network, and a second path protection switch for receiving low-order signals from the low-order interfaces and transferring one of them to the path setting units so that the path setting units may insert the signal into the high-order network.

8 Claims, 14 Drawing Sheets

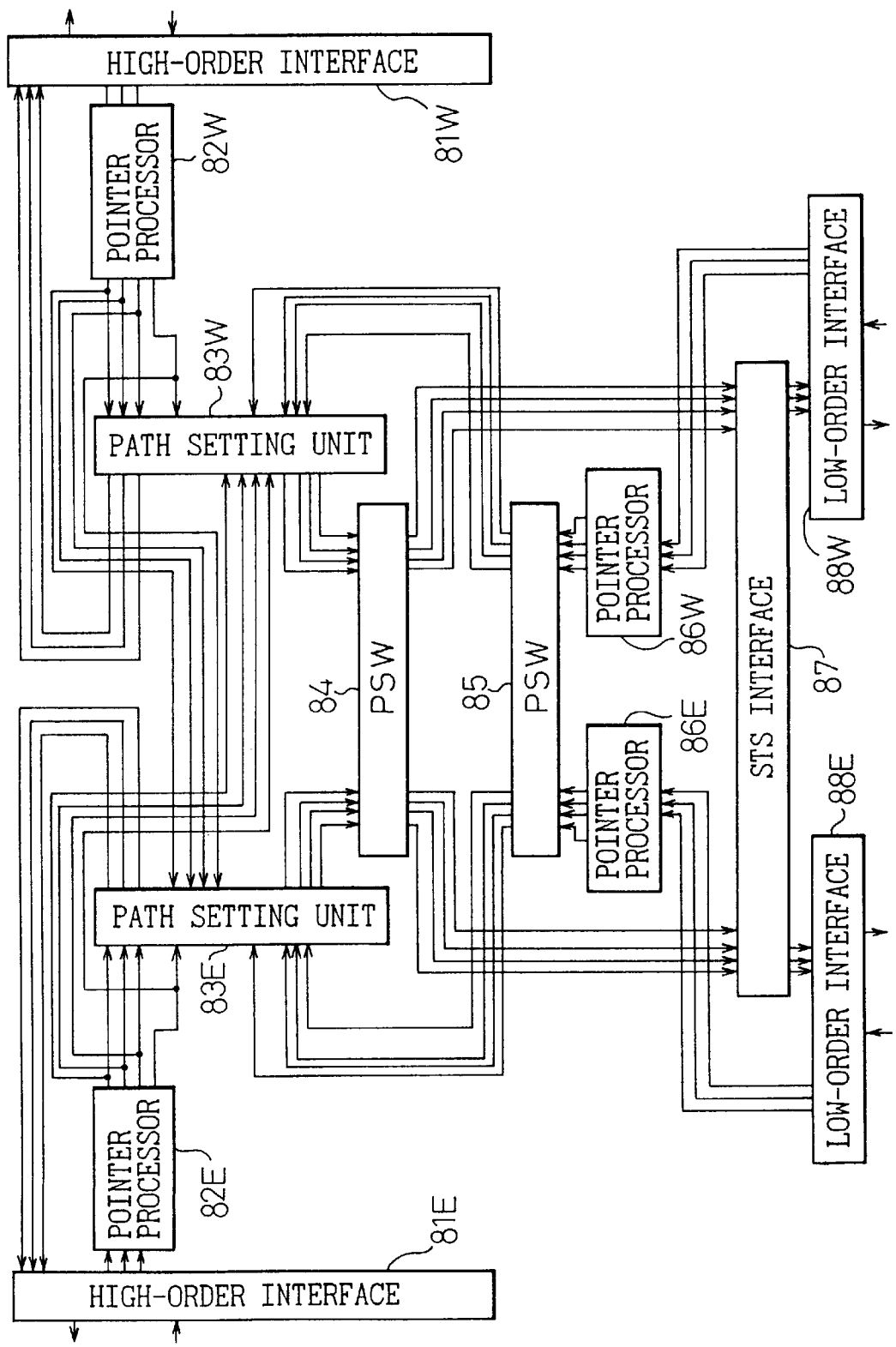

ADD-DROP MULTIPLEXING APPARATUS

BACKGROUND OF THE INVENTION

1. Field of the Invention

The present invention relates to an add-drop multiplexing (ADM) apparatus for dropping a low-order signal from a high-order signal, or adding a low-order signal to a high-order signal.

The ADM apparatus is used for an SONET (synchronous optical network) and an SDH (synchronous digital hierarchy), to carry out cross-connections by dropping a low-order signal from a high-order signal and adding a low-order signal to a high-order signal. It is required to improve the efficiency of the ADM apparatus and reduce the cost thereof.

2. Description of the Related Art

To transfer a signal between high-order networks or between a high-order network and a low-order network according to a prior art, each network must have an ADM apparatus to drop a low-order signal from the network, secure a path for the dropped signal, and add the dropped signal to the other network. Each ADM apparatus must have a low-order interface to be connected to the ADM apparatus of the other network, as well as path setting units whose outputs are selected according to selection data.

This arrangement of the prior art increases the scale and cost of a network system because each network must employ an ADM apparatus when connecting it to another network and because each ADM apparatus must have a low-order interface to be connected to another ADM apparatus.

The prior art involves intricate path setting and must have a device for generating an unequipped signal for a path that is not ready.

The prior art arranges an alarm detector for each signal level to complicate the structure of the ADM apparatus.

SUMMARY OF THE INVENTION

An object of the present invention is to provide a compact, inexpensive add-drop multiplexing (ADM) apparatus.

The present invention accomplishes the object as follows:

(1) An ADM apparatus has high-order interfaces, path setting units, a dropping path protection switch, an inserting path protection switch, and low-order interfaces. Each of the path setting units sets a path for an input/output signal according to path data and drops or inserts the signal. The dropping path protection switch selects one of the signals dropped by the path setting units. The inserting path protection switch selects a signal to be inserted by the path setting units. This apparatus needs no low-order interfaces for connecting the path protection switches to each other.

(2) Each of the path setting units is connected to a first double ring network, to set a path for an input/output signal according to path data and drop or insert the signal. The dropping path protection switch selects one of the signals dropped by the path setting units and transfers the selected one to a second double ring network connected to the low-order interfaces. The inserting path protection switch selects one of signals received from the second double ring network through the low-order interfaces, so that the selected one may be inserted by the path setting units into the first double ring network. The ADM apparatus economically combines the first and second double ring networks together.

(3) Each of the path setting units may have a first path setter for dropping a low-order signal from a high-order signal according to path data, a second path setter for setting a path for a low-order signal according to the path data, and a selector for selecting one of the low-order signals provided by the first and second path setters according to selection data.

(4) Each of the path setting units may have an unequipped signal generator for generating an unequipped signal for an unequipped path according to an unequipped flag contained in the path data.

(5) An ADM apparatus has STS (synchronous transport signal) path setting units and an STS path protection switch. Each of the STS path setting units sets a path for an STS according to path data and drops or inserts the STS. The STS path protection switch protects the set path. The ADM apparatus also has an STS/STS SPE converter for providing an STS SPE (synchronous payload envelope) according to the STS. Each of the STS path setting units sets a path for the STS SPE according to path data. The path protection switch has a selector for selecting one of signals provided by the STS path setting units, alarm detectors each for detecting an alarm in a corresponding signal, and a controller for controlling the selector according to any alarm detected by the alarm detectors.

(6) Each of the STS path setting units may receive an STS SPE and an alarm, if any, from an alarm detector arranged in an STS path terminator and sets a path according to path data. In this case, the STS path protection switch may have a selector for receiving signals dropped by the STS path setting units and a path switch controller for controlling the selector according to an alarm supplied from the path setting units.

(7) An ADM apparatus has VT (virtual tributary) path setting units and a VT path protection switch. Each of the VT path setting units sets a path for a VT signal according to path data and drops or inserts the VT signal. The VT path protection switch protects the set path. Each of the VT path setting units receives, from a VT pointer processor, a VT SPE indication signal, a timing pulse for indicating the start of the VT SPE, and a VT signal and sets a path according to path data. The VT path protection switch may have VT path performance monitors, VT alarm detectors, a selector, and a path switch controller for controlling the selector according to any alarm detected.

(8) Each of the VT path setting units may receive a VT signal and a VT alarm signal and sets a path according to path data. In this case, the VT path protection switch may have a selector for receiving the VT signals from the VT path setting units and a path switch controller for controlling the selector according to the alarm.

BRIEF DESCRIPTION OF THE DRAWINGS

The present invention will be more clearly understood from the description as set forth below with reference to the accompanying drawings, in which:

FIG. 13 shows an ADM apparatus according to a ninth embodiment of the present invention.

DESCRIPTION OF THE PREFERRED EMBODIMENTS

For a better understanding of the preferred embodiments of the present invention, the prior art will be explained with reference to FIGS. 1 to 4B.

Figure 1:
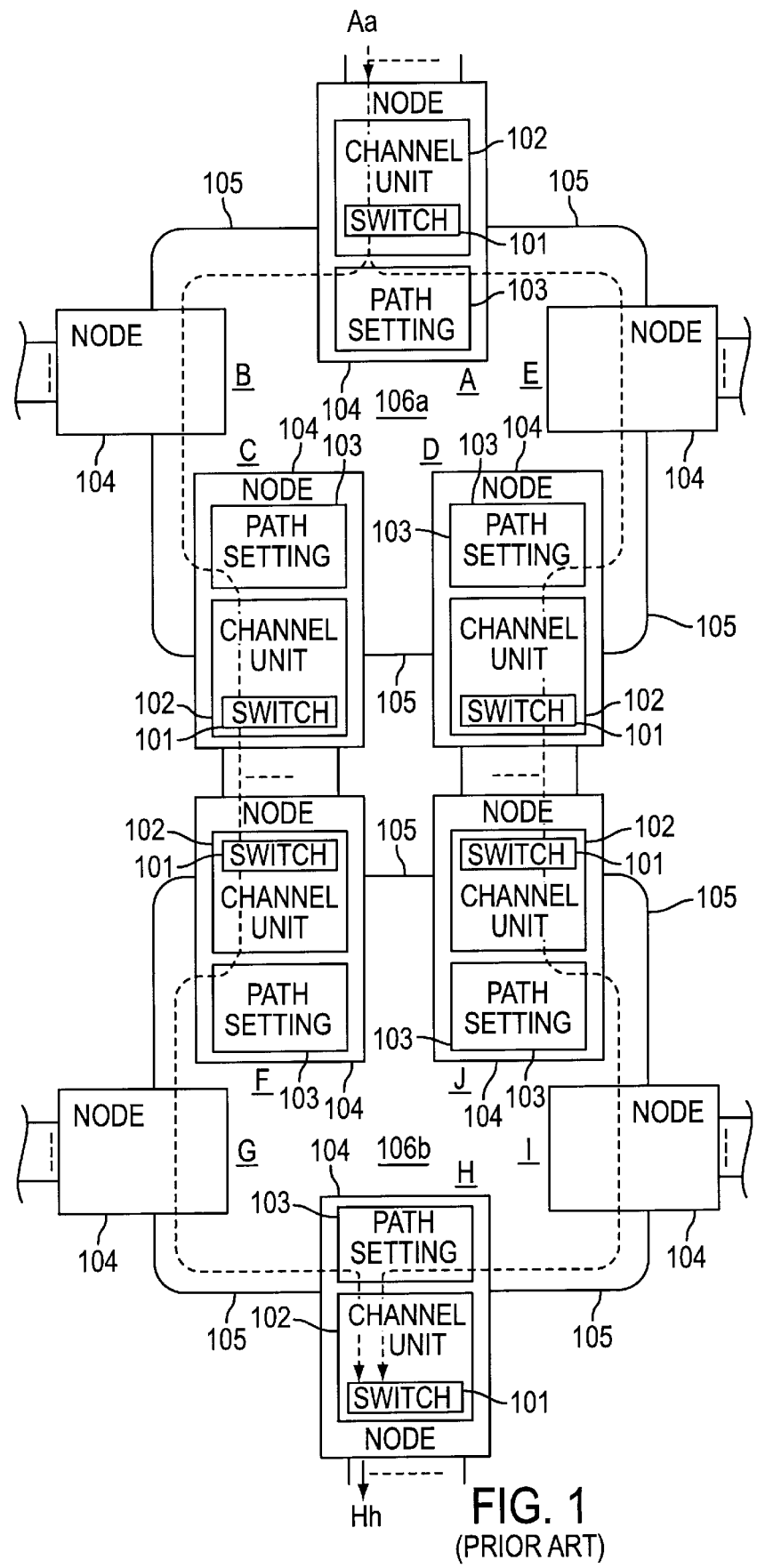
FIG. 1 shows a combination of ring networks.

FIG. 1 shows a combination of double ring networks.

The double ring networks involve network elements or nodes A to J (104). Each node has a path switch 101, a channel unit 102, and a path setting unit 103. The nodes A to E are connected to one another through a transmission line 105, to form the double ring network 106a. The nodes F to J are connected to one another through a transmission line 105, to form the double ring network 106b. The nodes C and F are connected to each other, and the nodes D and J are connected to each other, to combine the double ring networks 106a and 106b together.

The nodes A to J transmit optical signals such as OC-3 (150 Mbps), OC-12 (600 Mbps), and OC-48 (2.4 Gbps) through the transmission line 105. In each node, a received optical signal is converted into an electric signal. The path setting unit 103 drops a low-order signal such as an STS (synchronous transport signal) or a VT (virtual tributary) signal from the optical signal. The dropped signal is transmitted through the channel unit 102. On the other hand, the channel unit 102 provides the path setting unit 103 with a low-order signal. The path setting unit 103 inserts the low-order signal into a high-order signal, which is converted into an optical signal and is sent out to the transmission line 105.

Between the nodes C and F or between the nodes D and J, the path setting unit 103 of one of the nodes drops a low-order signal from a high-order signal, and the dropped low-order signal is transferred to the other node. The path setting unit 103 of the node that receives the low-order signal inserts the same into a high-order signal. As a result, the double ring networks 106a and 106b are connected to each other, to operate as a single double ring network.

For example, a terminal Aa of the node A transmits data to a terminal Hh of the node H through two paths, one passing through the nodes A, B, C, F, G, and H, and the other passing through the nodes A, E, D, J, I, and H. The node H receives the same data from both the nodes G and I, and the path switch 101 of the node H selects a normal one of them. If any one of the paths fails, the path switch 101 switches to a normal one. As a result, communication between the nodes A and H belonging to the different double ring networks 106a and 106b is secured.

Figure 2:
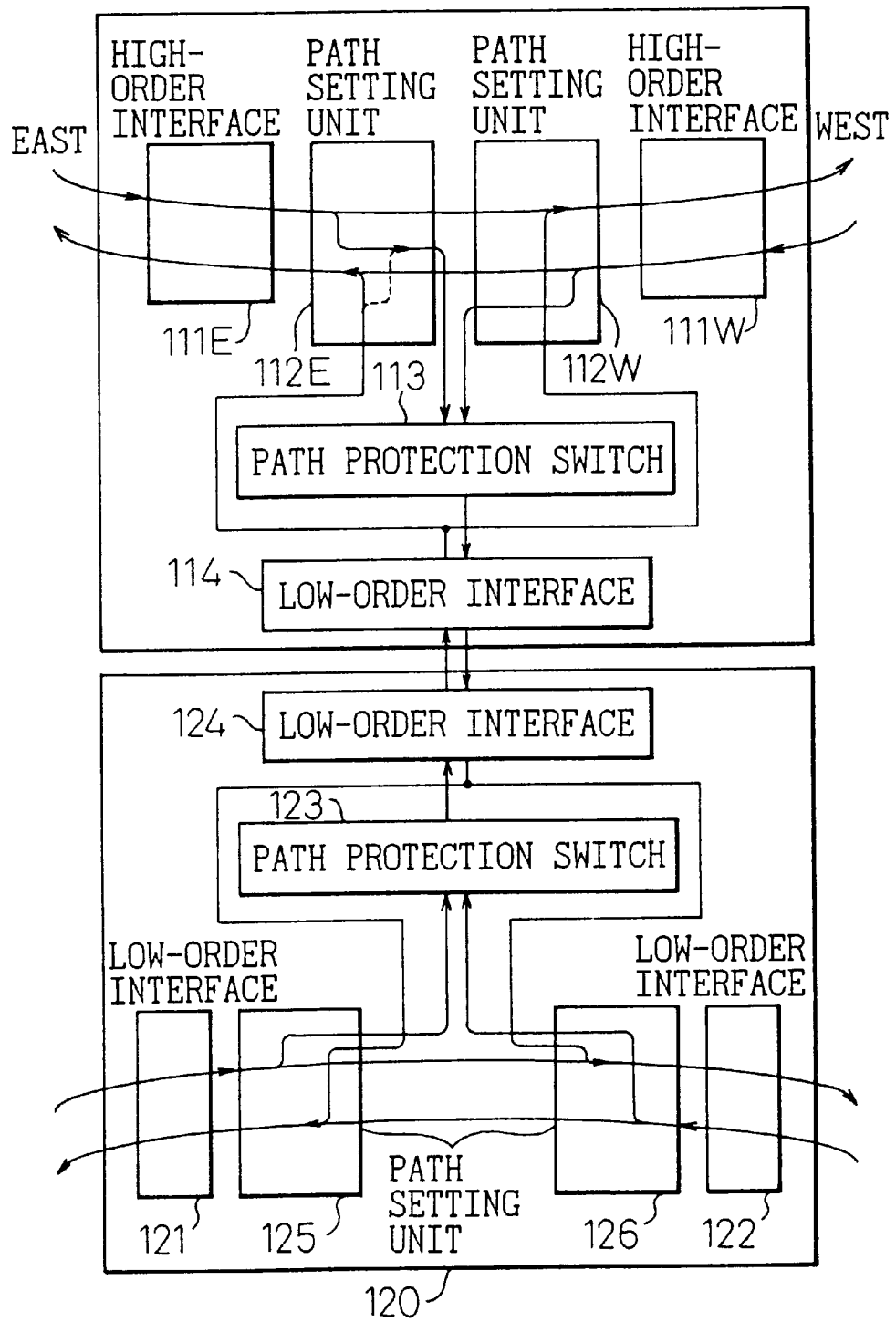
FIG. 2 shows ADM apparatuses for connecting a high-order network to a low-order network, according to a prior art.

FIG. 2 shows add-drop multiplexing apparatuses according to the prior art, for connecting a high-order network to a low-order network.

The high-order ADM apparatus 110 has high-order interfaces 111E and 111W, path setting units 112E and 112W, a path protection switch 113, and a low-order interface 114. The low-order ADM apparatus 120 has low-order interfaces 121 and 122, a path protection switch 123, a low-order interface 124, and path setting units 125 and 126.

The high-order interfaces 111E and 111W are arranged at the east (E) and west (W) sides, respectively, of the high-order ADM apparatus 110 and have each an opto-electric converter and an electro-optic converter. The opto-electric converter converts an optical signal received through an optical transmission line into an electric signal, which is transferred to the path setting unit 112E (112W). The electro-optic converter converts an electric signal from the path setting unit 112E (112W) into an optical signal, which is sent out to the optical transmission line.

Each of the path setting units 112E and 112W drops a low-order signal from a high-order signal and sends the low-order signal to the low-order interface 114. Alternatively, each of the path setting units 112E and 112W inserts a low-order signal from the low-order interface 114 into a high-order signal.

Each of the path setting units 125 and 126 of the low-order ADM apparatus 120 drops a low-order signal from a low-order signal received from a transmission line and sends the dropped signal to the low-order interface 124. Alternatively, each of the path setting units 125 and 126 inserts a low-order signal sent from the low-order interface 124 into a low-order signal, which is sent out to the transmission line. The low-order interface 114 of the high-order ADM apparatus 110 communicates low-order signals with the low-order interface 124 of the low-order ADM apparatus 120, to connect the high-order network and low-order network to each other.

Each of the path protection switches 113 and 123 switches dropped low-order signals from one to another according to an alarm detected in an STS path layer or in a VT path layer. The alarm may be detected when a low-order signal dropped by the path setting unit 112E of the ADM apparatus 110 is selected by the path protection switch 113 for the low-order interface 114. Then, the path protection switch 113 switches to a normal low-order signal dropped by the path setting unit 112W and transfers the same to the low-order interface 114. The path protection switch 123 of the ADM apparatus 120 works in the same manner.

To adopt the ADM apparatuses of FIG. 2 for the nodes, for example, F and J of the combined ring networks of FIG. 1, the low-order ADM apparatus 120 is replaced with the high-order ADM apparatus 110.

Figure 3:
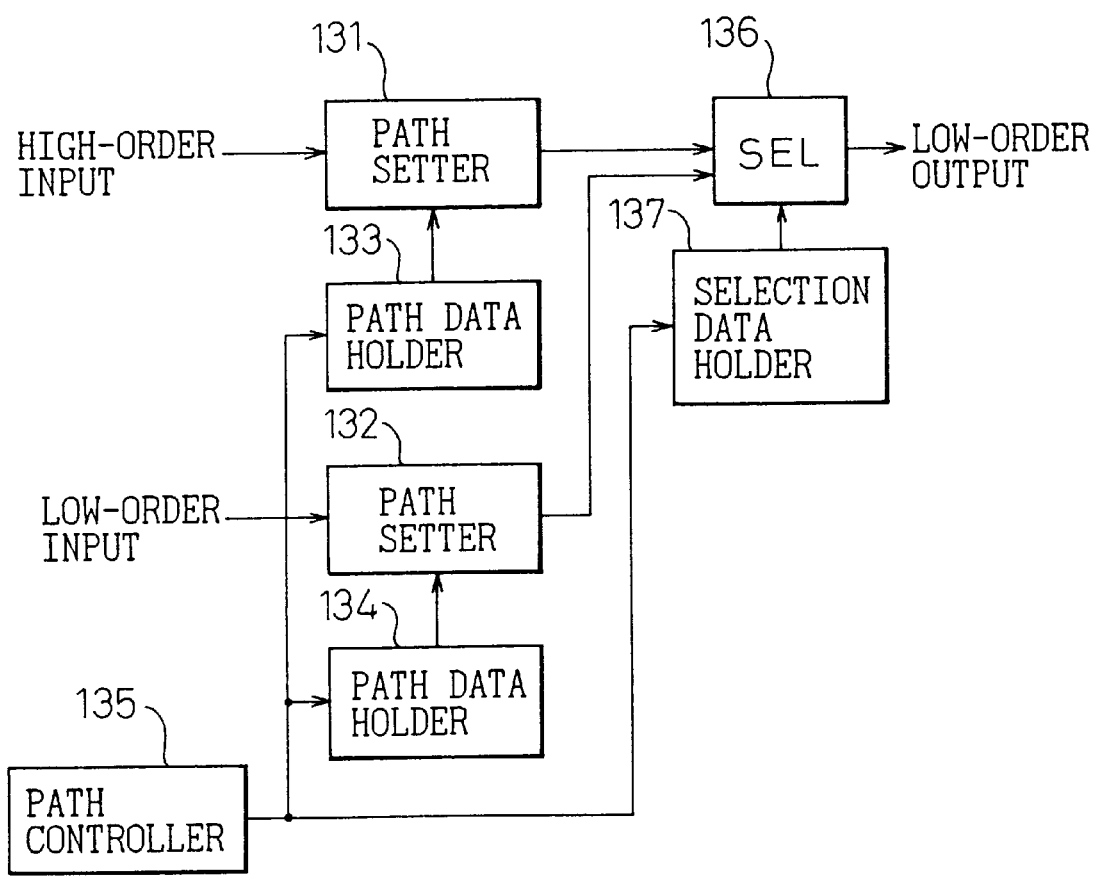
FIG. 3 shows the details of a path setting unit of the ADM apparatuses of FIG. 2.

FIG. 3 shows the details of the path setting unit (for example, 112E of FIG. 2) according to the prior art. The path setting unit includes a high-order path setter 131, a low-order path setter 132, path data holders 133 and 134, a path controller 135, a selector 136, and a selection data holder 137.

The high-order path setter 131 sets a path for a low-order signal dropped from a high-order signal. The low-order path setter 132 sets a path for a low-order signal to be returned to the low-order side as indicated with a dotted line in the path setting unit 112E of FIG. 2. The path setters 131 and 132 are controlled according to path data stored in the holders 133 and 134. The path controller 135 updates the data stored in the holders 133 and 134 as well as selection data stored in the holder 137. The selector 136 selects one of the low-order signals provided by the path setters 131 and 132 according to the selection data stored in the holder 137.

Each of the path setters 131 and 132 has a unit for providing an unequipped signal UNEQ for an unequipped path.

Figure 4A:
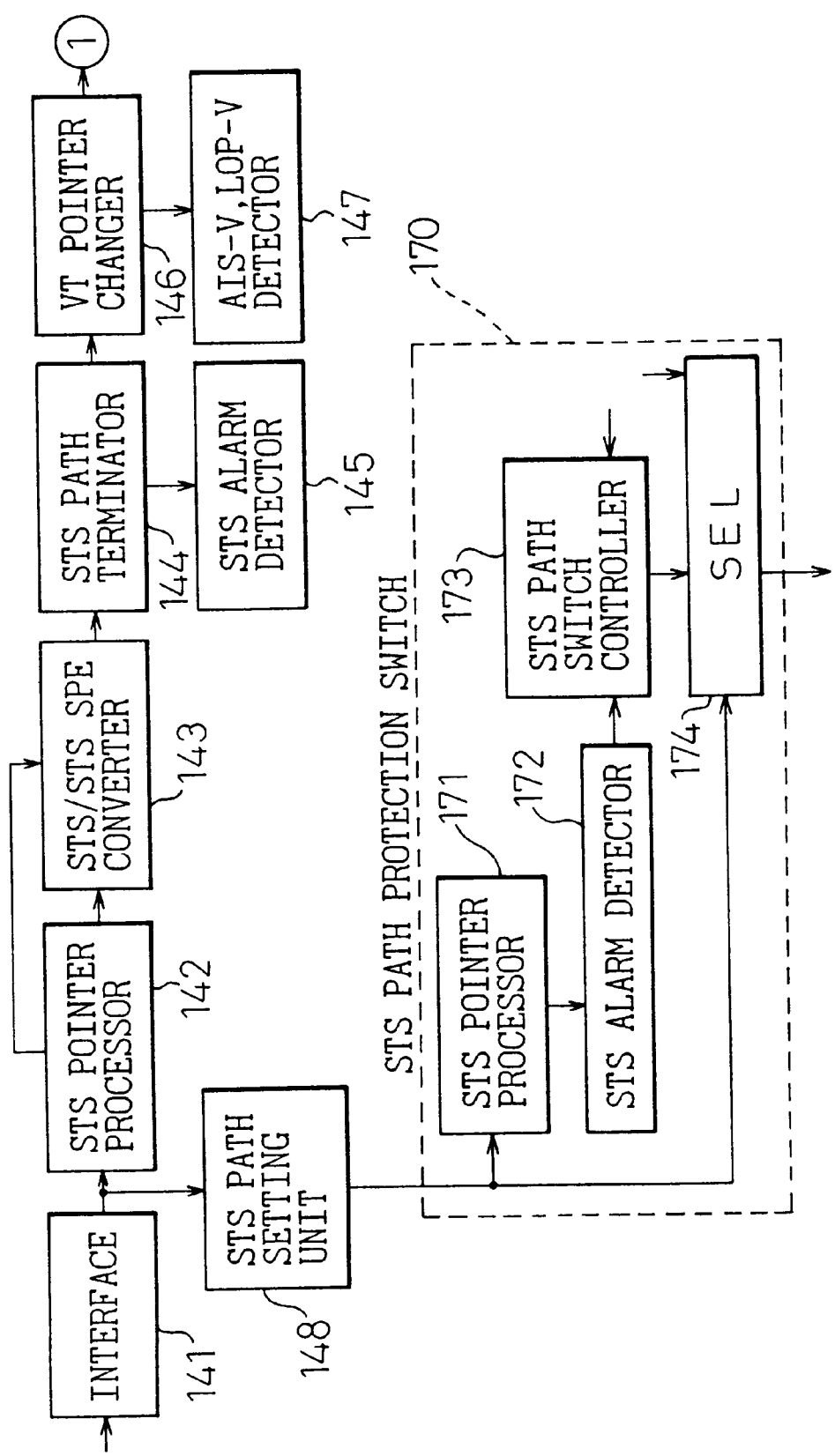
FIGS. 4A and 4B show an ADM apparatus according to another prior art.
Figure 4B:
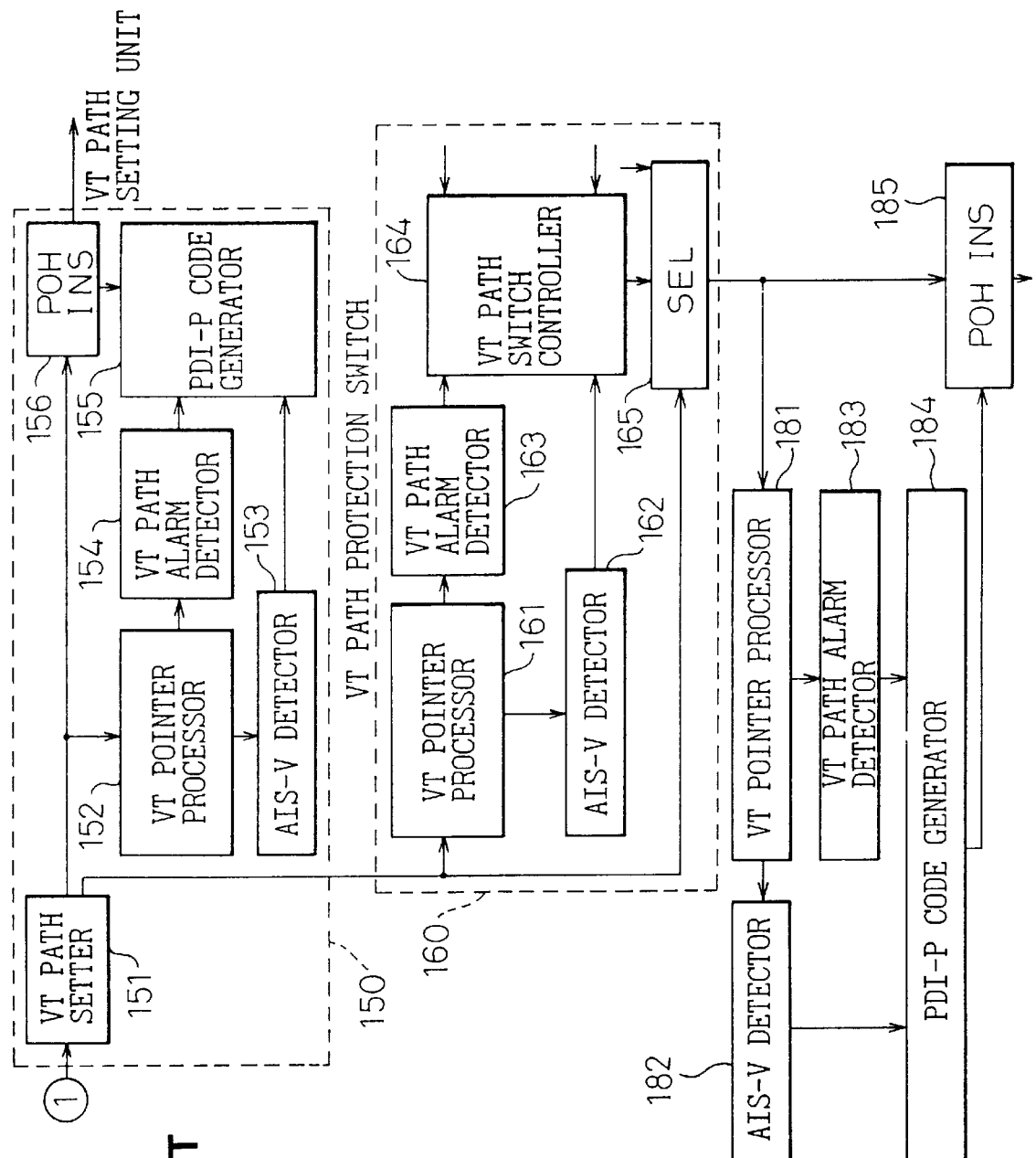

FIGS. 4A and 4B show an ADM apparatus according to another prior art.

The ADM apparatus has an interface 141, an STS pointer processor 142, an STS/STS SPE converter 143, an STS path terminator 144, an STS alarm detector 145, a VT pointer changer 146, an AIS-V/LOP-V detector 147 for detecting an AIS-V (alarm indication signal for VT) and an LOP-V (loss of pointer for VT), and an STS path setting unit 148. A VT path setting unit 150 has a VT path setter 151, a VT pointer processor 152, an AIS-V detector 153, a VT path alarm detector 154, a PDI-P (payload defect indication path layer) code generator 155, and a path overhead (POH) inserter 156.

A VT path protection switch 160 has a VT pointer processor 161, an AIS-V detector 162, a VT path alarm detector 163, a VT path switch controller 164, and a selector 165. An STS path protection switch 170 has an STS pointer processor 171, an STS alarm detector 172, an STS path switch controller 173, and a selector 174. The ADM apparatus also includes a VT pointer processor 181, an AIS-V detector 182, a VT path alarm detector 183, a PDI-P code generator 184, and a POH inserter 185.

The interface 141 converts an optical signal OC-3 (150 Mbpos) into three parallel electric signals, i.e., STS-1s (51.84 Mbps), which are supplied to the STS pointer processor 142 and to the STS path setting unit 148. In this example, the STS pointer processor 142 and the following devices process VT signals, and the STS path setting unit 148 and the following devices process STSs.

The STS path setting unit 148 cross-connects the STSs. In the STS path protection switch 170, the STS pointer processor 171 and STS alarm detector 172 are on the east side, and there are the same STS pointer processor and STS alarm detector on the west side as indicated with two arrow marks. If any one of the east and west STS alarm detectors detects an alarm signal, the STS path switch controller 173 controls the selector 174 to select a normal STS.

The STS pointer processor 142 identifies a pointer in each STS, and the STS/STS SPE converter 143 separates a payload (SPE) from the STS. The STS alarm detector 145 detects an alarm signal out of the STS passing through the STS path terminator 144. The AIS-V/LOP-V detector 147 detects AIS-V and/or LOP-V in the VT pointer changer 146.

The VT path setter 151 separates VT signals from the STS SPE and carries out cross-connections. The VT path setter 151 has, for example, a demultiplexer for demultiplexing STS-1 (51.84 Mbps) into VT1.5 (1.754 Mbps), a spatial switch for exchanging VT signals, and a multiplexer for multiplexing VT signals.

The AIS-V detector 153 and VT path alarm detector 154 detect an AIS-V and a VT path alarm signal out of a VT signal passed through the VT pointer processor 152. The PDI-P code generator 155 generates a PDI-P (payload defect indicating path layer) code, which is supplied to the POH inserter 156. The output of the POH inserter 156 is supplied to a VT path setting unit on the west side.

Each VT signal dropped by the VT path setter 151 is transferred to the VT path protection switch 160. The AIS-V detector 162 receives the VT signal through the VT pointer processor 161 and detects an AIS (alarm indication signal) therefrom, if any. The VT path alarm detector 163 detects a VT path alarm signal from the VT signal, if any. If any alarm signal is detected in the VT signal on the east side, the VT path switch controller 164 controls the selector 165 to select a VT signal on the west side.

The AIS-V detector 182 and VT path alarm detector 183 detect an AIS and a VT path alarm signal in a VT signal provided by the VT path protection switch 160. If any alarm signal is detected, the PDI-P code generator 184 generates a PDI-P code, which is inserted into the VT signal by the POH inserter 185.

Now, preferred embodiments of the present invention will be explained.

Figure 5:
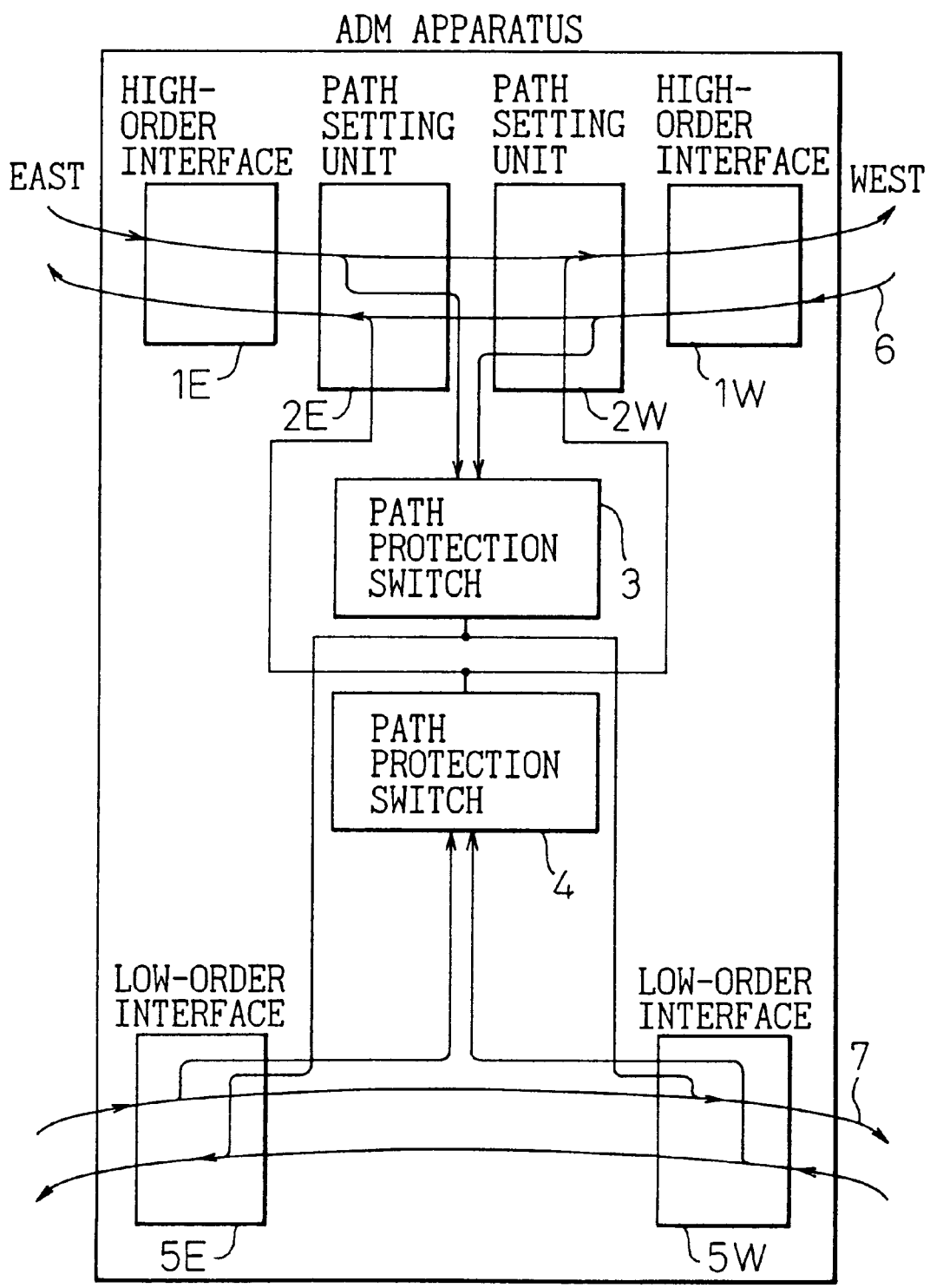
FIG. 5 shows an ADM apparatus according to a first embodiment of the present invention.

FIG. 5 shows an ADM apparatus according to the first embodiment of the present invention.

The ADM apparatus has east and west high-order interfaces 1E and 1W, east and west path setting units 2E and 2W, path protection switches 3 and 4, and east and west low-order interfaces 5E and 5W. The ADM apparatus is connected to a high-order network transmission line 6 and to a low-order network transmission line 7 and links the transmission lines 6 and 7 to each other.

Each of the high-order interfaces 1E and 1W has an opto-electric converter and an electro-optic converter, to convert an optical signal received from the transmission line 6 into an electric signal for the path setting unit 2, and an electric signal received from the path setting unit 2 into an optical signal which is transmitted to the transmission line 6.

The path setting units 2E and 2W demultiplex (drop) each a high-order signal into low-order signals and set paths (cross-connects) for the low-order signals. Also, the path setting units multiplex (add) each low-order signals into a high-order signal. Low-order signals dropped by the path setting units 2E and 2W are supplied to the path protection switch 3, which selects a normal one of the signals and transfers the selected one to the low-order interfaces 5E and 5W, which transmit the same to the transmission line 7.

The path protection switch 4 selects a normal one of low-order signals provided by the low-order interfaces 5E and 5W and transfers the selected one to the path setting units 2E and 2W, which add the same to a high-order signal. In this way, the ADM apparatus of the first embodiment handles both high- and low-order networks, to eliminate the low-order interfaces 114 and 124 of FIG. 2 of the prior art. In addition, the first embodiment eliminates the low-order path setting units 125 and 126 of the prior art. As a result, the ADM apparatus of the first embodiment is compact.

The first embodiment is applicable to connect high-order networks to each other. In this case, the low-order interfaces 5E and 5W are replaced with high-order interfaces (1E, 1W). A high-order signal is dropped from one of the high-order networks and is added to the other network through the high-order interfaces and path protection switch. This arrangement also eliminates the low-order interfaces that face each other and a pair of path setting units of the prior art, and therefore, is compact.

Figure 6:
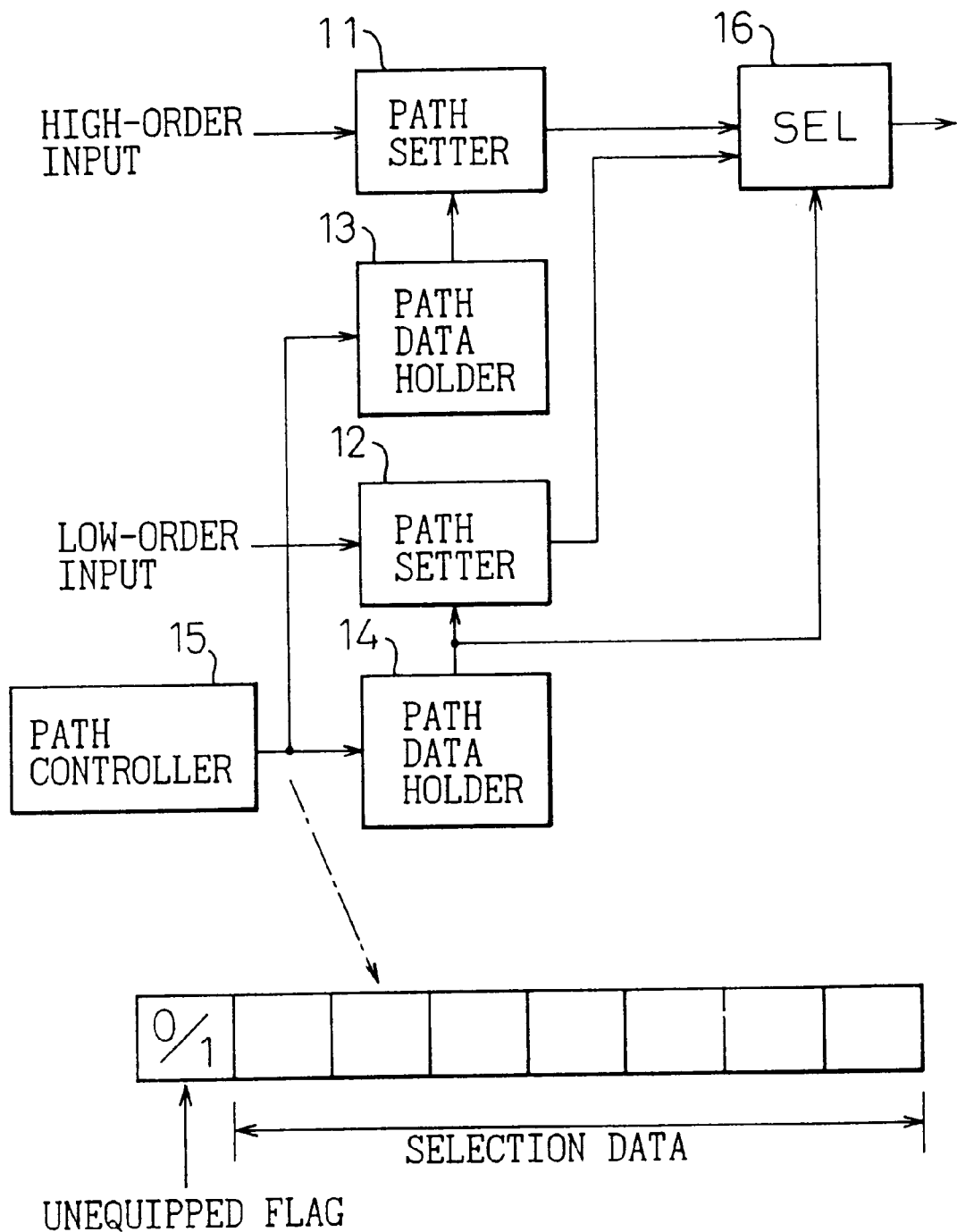
FIG. 6 shows a path setting unit of an ADM apparatus according to a second embodiment of the present invention.

FIG. 6 shows a path setting unit of an ADM apparatus according to the second embodiment of the present invention.

The path setting unit has a high-order path setter 11, a low-order path setter 12, path data holders 13 and 14, a path controller 15, and a selector 16. The path setter 11 drops a low-order signal from a high-order signal and provides the selector 16 with the dropped low-order signal. The path setter 12 sets a path for a low-order signal from a low-order side.

The path controller 15 writes path data into the holders 13 and 14. The bottom of FIG. 6 shows a format of the path data. The format includes an unequipped flag to indicate an unequipped path and selection data. The selector 16 selects one of low-order signals provided by the path setters 11 and 12. In the example of FIG. 6, the selector 16 is controlled according to selection data stored in the holder 14.

The selector 16 usually selects, according to the selection data held in the holder 14, the low-order signal from the path setter 12. If the path setter 12 sets no path for the low-order signal thereof, the selector 16 selects the low-order signal from the path setter 11. In this way, the high- and low-order path setters 11 and 12 simultaneously set paths, and selection data for the selector 16 is automatically set.

Figure 7:
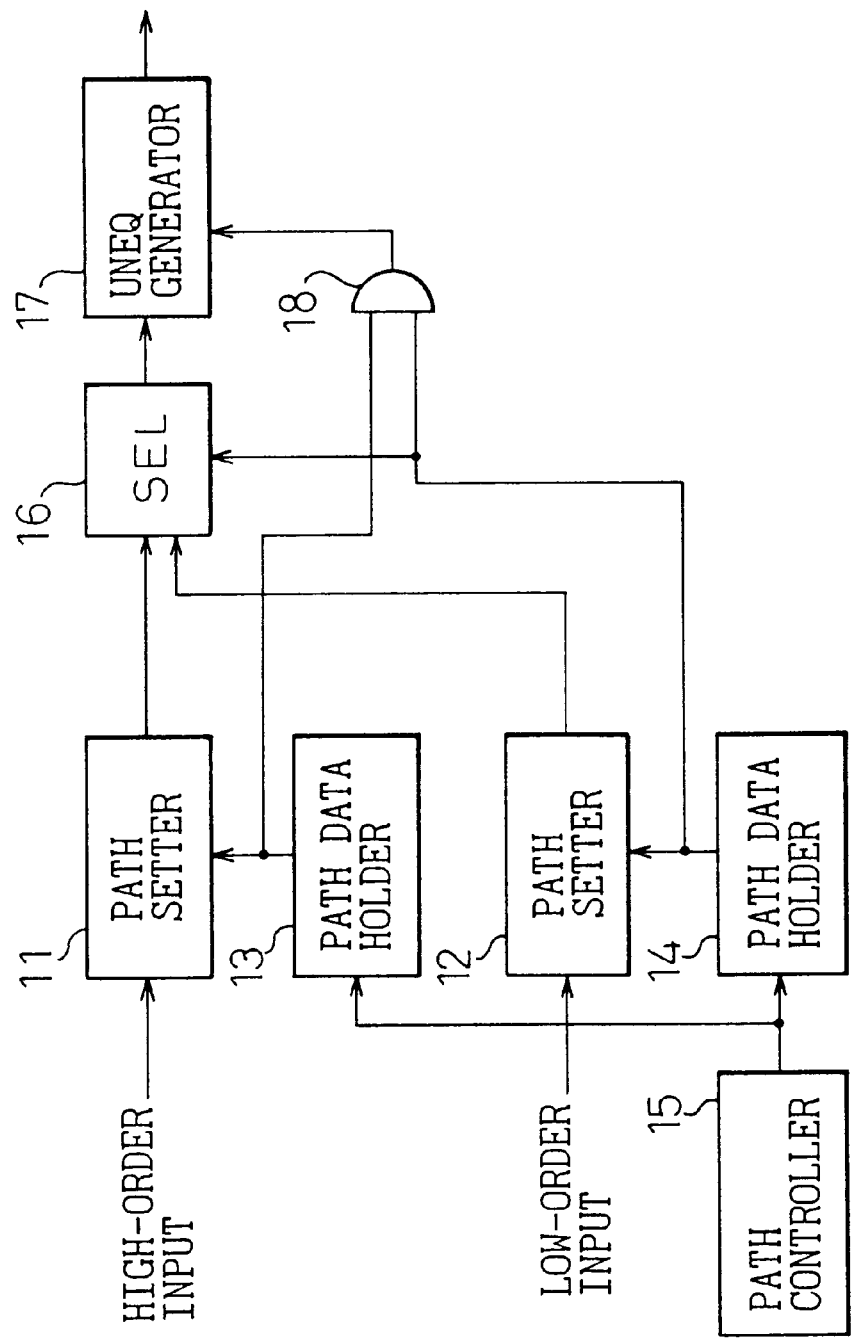
FIG. 7 shows a path setting unit of an ADM apparatus according to a third embodiment of the present invention.

FIG. 7 shows a path setting unit of an ADM apparatus according to the third embodiment of the present invention. The same parts as those of FIG. 6 are represented with like reference marks and are not explained again.

The path setting unit has an unequipped code generator 17 and an AND circuit 18. The unequipped code generator 17 generates an unequipped code UNEQ for an unequipped path. Path data holders 13 and 14 hold each path data in the format of FIG. 6. The flag contained in the format is "1" for an unequipped path. If no path is ready for each of path setting units 11 and 12, the AND circuit 18 provides an output signal of "1." Then, the unequipped code generator 17 provides the unequipped code UNEQ. Accordingly, there is no need of determining an equipped or unequipped state. The unequipped code generator 17 automatically provides the unequipped signal UNEQ for an unequipped path.

Figure 8:
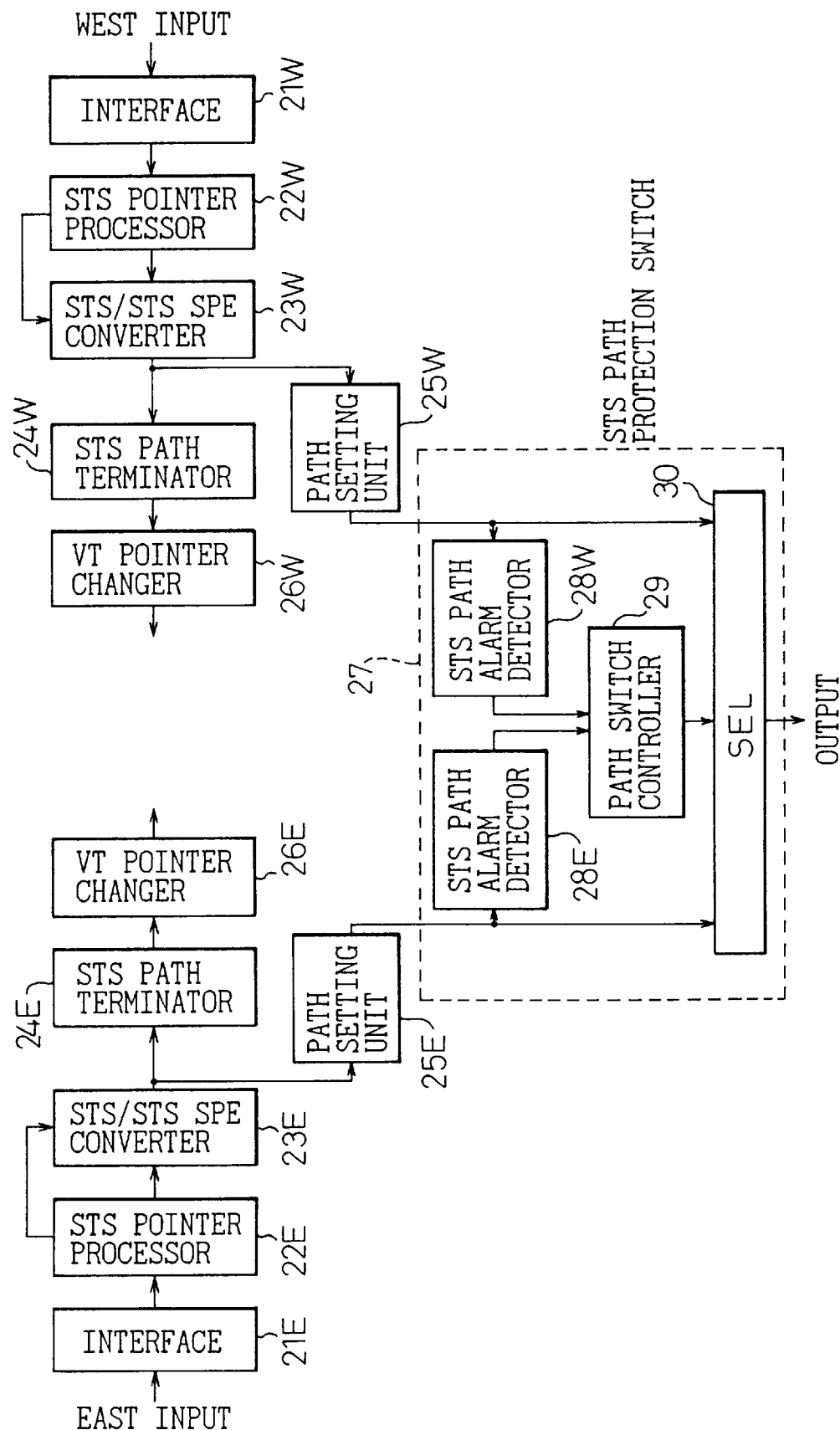
FIG. 8 shows an ADM apparatus according to a fourth embodiment of the present invention.

FIG. 8 shows an STS processing part of an ADM apparatus according to the fourth embodiment of the present invention.

The ADM apparatus has interfaces 21E and 21W, STS pointer processors 22E and 22W, STS/STS SPE converters 23E and 23W, STS path terminators 24E and 24W, path setting units 25E and 25W, VT pointer changers 26E and 26W, and an STS path protection switch 27. The STS path protection switch has STS path alarm detectors 28E and 28W, a path switch controller 29, and a selector 30.

The east and west interfaces 21E and 21W interface with a network. The STS pointer processors 22E and 22W find the head of a payload in an STS. According to the output of the STS pointer processors 22E and 22W, the STS/STS SPE converters 23E and 23W convert the STSs into STS SPEs, which are transferred to the path setting units 25E and 25W.

The path setting units 25E and 25W set a path for each STS SPE and transfer the STS SPE to the STS path protection switch 27. If any one of the STS path alarm detectors 28E and 28W detects an alarm in the STS SPE, the path switch controller 29 controls the selector 30 to a normal path.

In this way, the STS/STS SPE converters 23E and 23W drop STS SPEs out of STSs, and the path setting units 25E and 25W transfer the STS SPEs to the path protection switch 27. The STS path alarm detectors 28E and 28W detect any alarm in the STS SPEs. Accordingly, the fourth embodiment eliminates the STS pointer processor 171 of the prior art of FIG. 4A. The arrangement of FIG. 8 of the fourth embodiment corresponds to the path setting units 2E and 2W and path protection switch 3 of FIG. 5.

Figure 9:
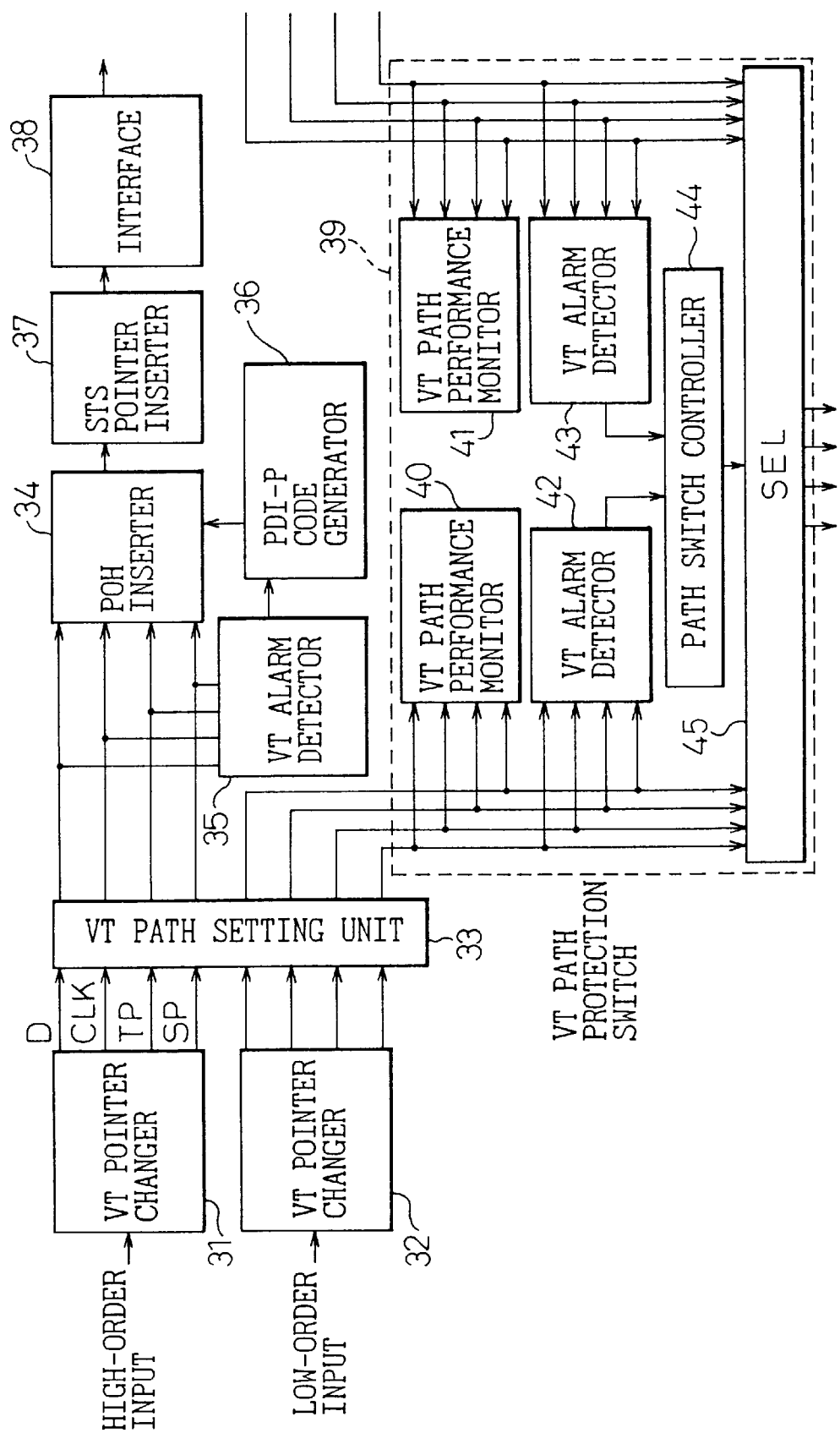
FIG. 9 shows an ADM apparatus according to a fifth embodiment of the present invention.

FIG. 9 shows a VT signal processing part of an ADM apparatus according to the fifth embodiment of the present invention.

The apparatus has high- and low-order VT pointer changers 31 and 32, a VT path setting unit 33, a POH inserter 34, a VT alarm detector 35, a PDI-P code generator 36, an STS pointer inserter 37, an interface 38, and a VT path protection switch 39. The VT path protection switch 39 has VT path performance monitors 40 and 41, VT alarm detectors 42 and 43, a path switch controller 44, and a selector 45.

The VT pointer changers 31 and 32 synchronize the frequencies of all VT signals by changing an input clock signal to a system master clock signal and provide the VT path setting unit 33 with a VT main signal D, a clock signal CLK, a timing pulse TP indicating the head of a VT SPE, and a signal SP indicating the VT SPE. The VT path setting unit 33 sets a path for each VT signal and transfers the VT signal to the VT path protection switch 39.

Any VT signal to be transferred to a transmission line without passing the VT path protection switch 39 is checked by the VT alarm detector 35. If an alarm is detected in the VT signal, the PDI-P code generator 36 generates a PDI-P code (payload defect indication STS path layer code), which is inserted into a path overhead (POH) by the POH inserter 34. The STS pointer inserter 37 inserts an STS pointer, and the signal is transmitted to the transmission line from the interface 38.

In the VT path protection switch 39, the VT path performance monitor 40 (41) monitors the performance of the VT signal. The VT alarm detector 42 (43) detects an alarm in the VT signal, if any. If there is any alarm, the switch controller 44 controls the selector 45 to select a normal VT signal.

In this way, the VT pointer changers each recognize the position of a VT SPE. Accordingly, the fifth embodiment eliminates the VT pointer processors 152 and 161 and AIS-V detectors 153 and 162 of the prior art of FIG. 4B. Any VT signal that is not dropped from an STS is checked by the VT alarm detector 35. Every dropped VT signal is checked by the VT alarm detector 42 (43). In this way, the fifth embodiment efficiently detects an alarm in a VT signal.

Figure 10:
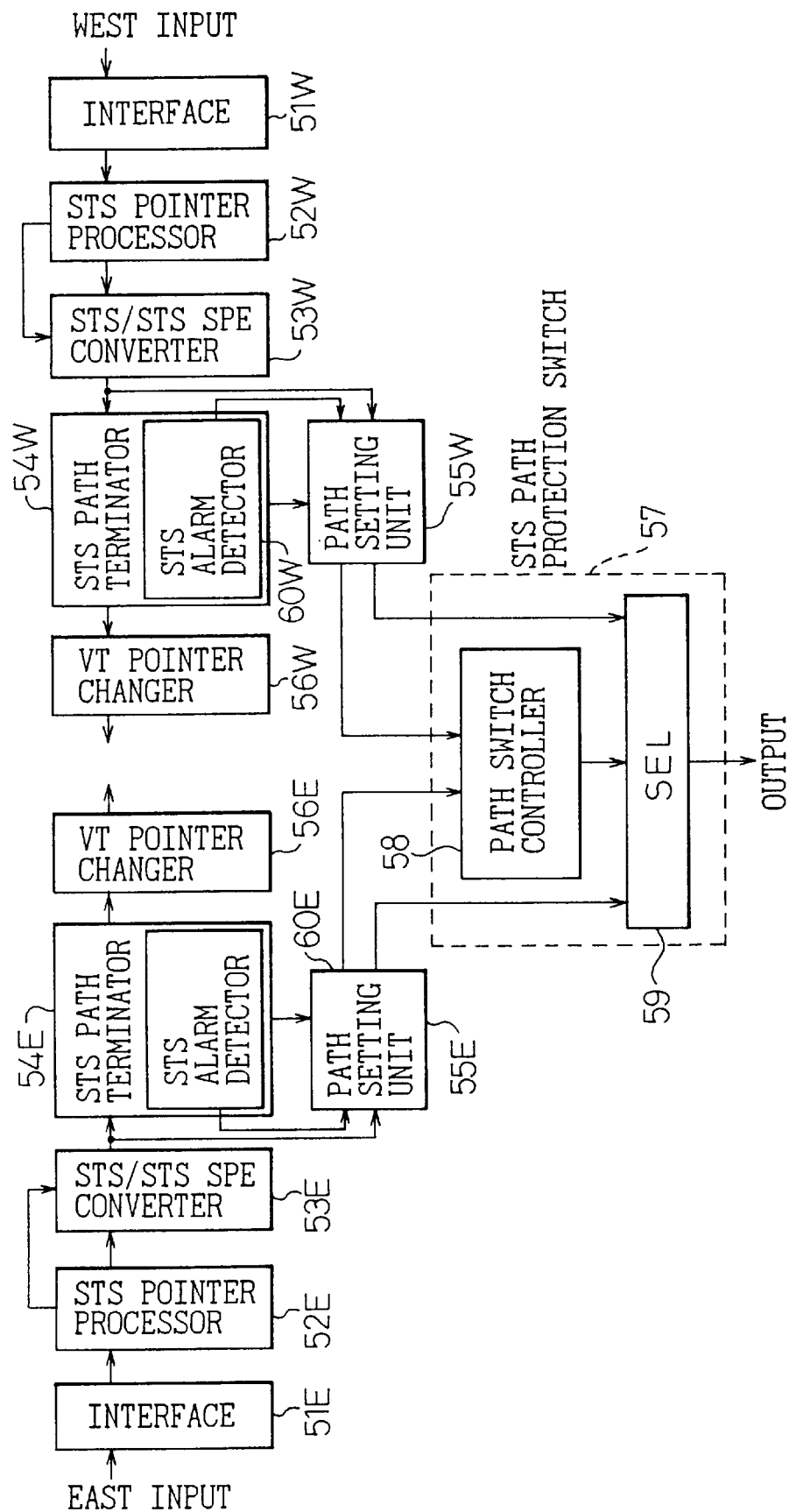
FIG. 10 shows an ADM apparatus according to a sixth embodiment of the present invention.

FIG. 10 shows an ADM apparatus according to the sixth embodiment of the present invention.

This apparatus is based on the fourth embodiment of FIG. 8. The apparatus has interfaces 51E and 51W, STS pointer processors 52E and 52W, STS/STS SPE converters 53E and 53W, STS path terminators 54E and 54W, STS alarm detectors 60E and 60W contained in the STS path terminators 54E and 54W, path setting units 55E and 55W, VT pointer changers 56E and 56W, and an STS path protection switch 57. The STS path protection switch 57 has a path switch controller 58 and a selector 59.

The STS path terminators 54E and 54W contain the STS alarm detectors 60E and 60W each for detecting an alarm in an STS. Any alarm detected and STSs are transferred to the path setting units 55E and 55W, which set paths for the STSs. The STS alarm detectors 60E and 60W transfer an alarm as serial data to the path setting units 55E and 55W, to simplify interfaces between them. The STS path protection switch 57 consists only of the selector 59 and path switch controller 58 that receives an alarm through the path setting units 55E and 55W. According to the alarm, the path switch controller 58 controls the selector 59 to select a normal one of the east and west paths.

In this way, the sixth embodiment incorporates the STS alarm detectors 60E and 60W in the STS path terminators 54E and 54W, respectively. Any detected alarm and STSs are supplied to the path setting units 55E and 55W, which set paths for the STSs. The sixth embodiment combines the STS alarm detectors 145 and 172 of the prior art of FIG. 4A into one, thereby simplifying the STS path protection switch 57.

Figure 11:
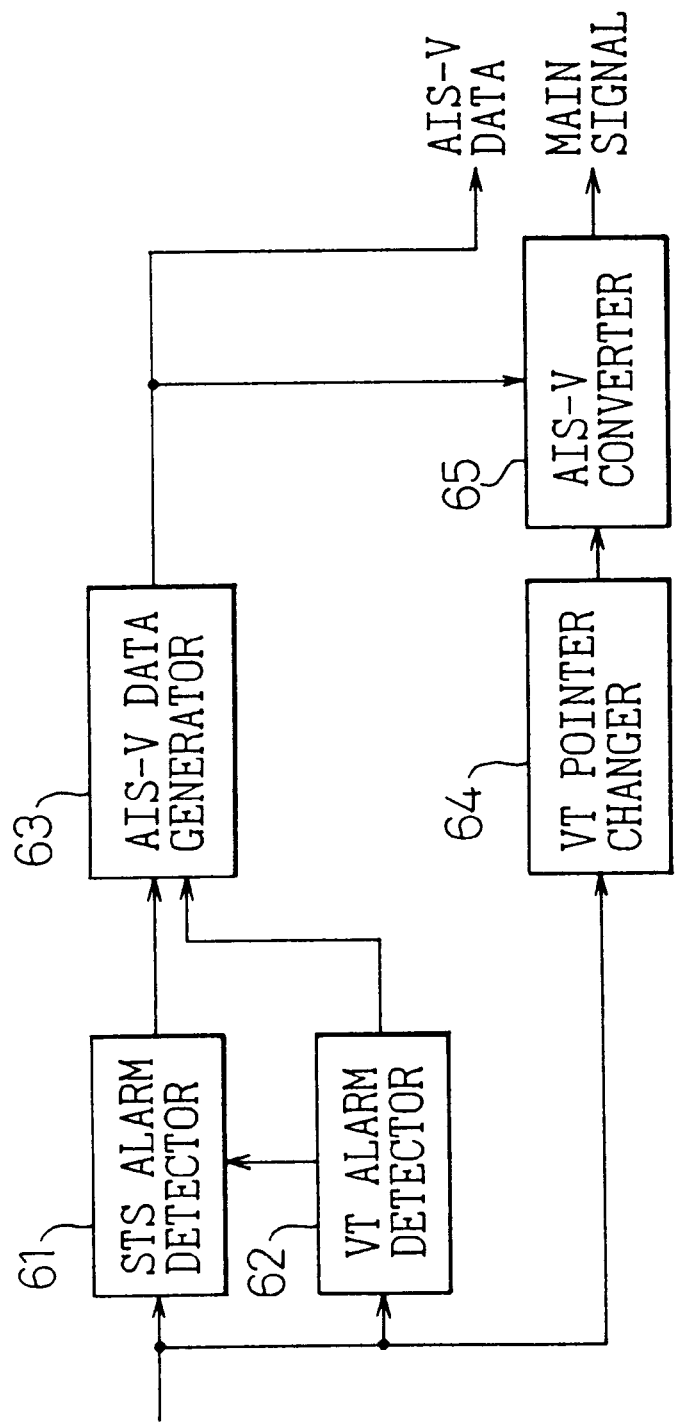
FIG. 11 shows an essential part of an ADM apparatus according to a seventh embodiment of the present invention.

FIG. 11 shows an essential part of an ADM apparatus according to the seventh embodiment of the present invention.

The apparatus has an STS alarm detector 61, a VT alarm detector 62, an AIS-V data generator 63, a VT pointer changer 64, and an AIS-V converter 65.

The STS alarm detector 61 and VT alarm detector 62 detect an alarm signal to be sent as an AIS-V (alarm indication signal for VT). The AIS-V data generator 63 generates data used to convert the alarm signal detected by the detectors 61 and 62 into an AIS-V. The data is supplied to the AIS-V converter 65 and to a path setting unit (not shown).

An STS is passed through the VT pointer changer 64 and is transferred to the AIS-V converter 65. If any one of the detectors 61 and 62 detects an alarm signal in the STS, the AIS-V converter 65 converts the alarm signal into an A-S-V according to data provided by the AIS-V data generator 63.

In this way, the seventh embodiment lets the path setting unit provide AIS-V data and a main signal. Accordingly, the seventh embodiment eliminates the VT alarm detectors 35, 42, and 43 of the fifth embodiment of FIG. 9.

Figure 12:
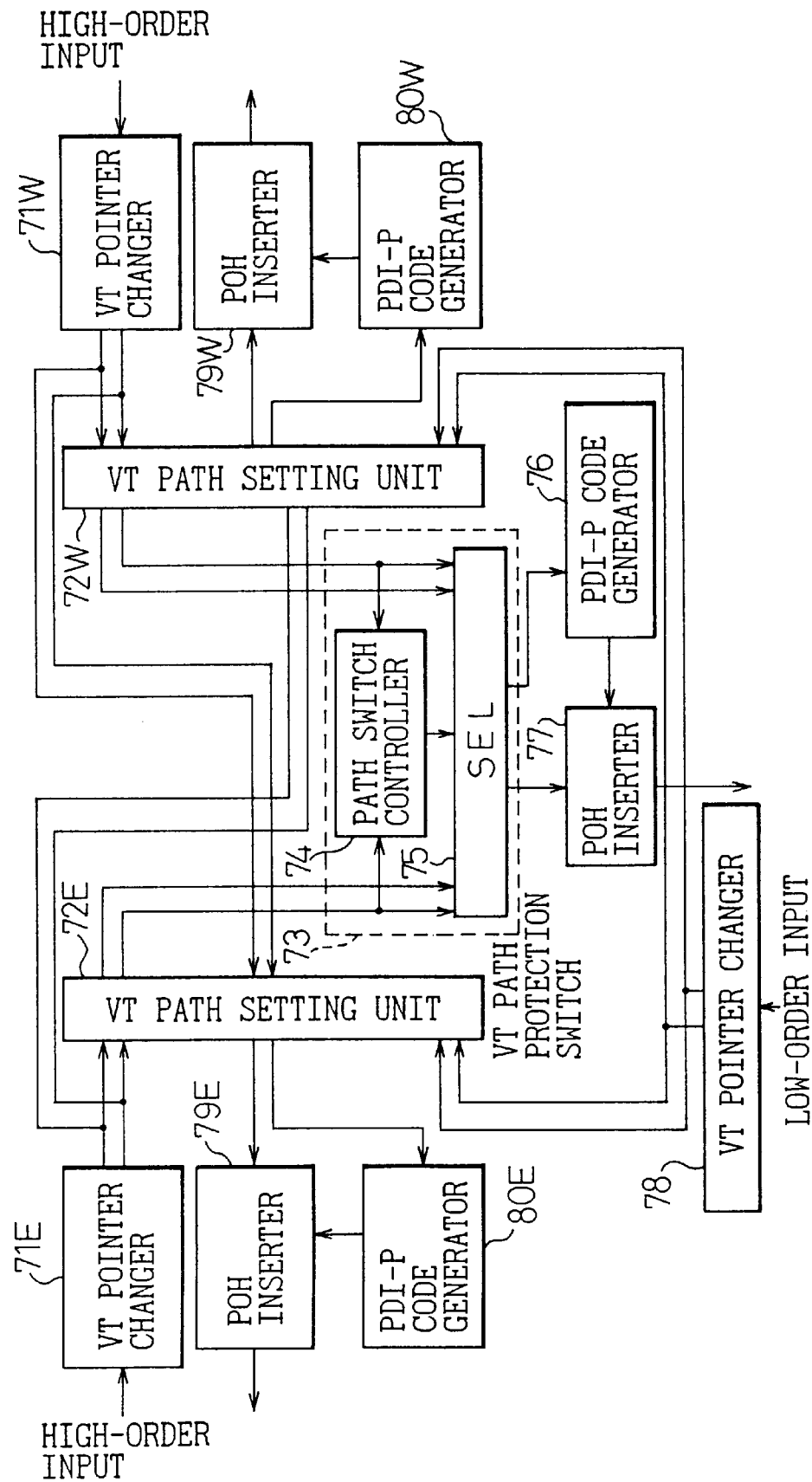
FIG. 12 shows an ADM apparatus according to an eighth embodiment of the present invention.

FIG. 12 shows an ADM apparatus according to the eighth embodiment of the present invention.

This apparatus has VT pointer changers 71E and 71W, VT path setting units 72E and 72W, a path protection switch 73, a path switch controller 74, a selector 75, a PDI-P code generator 76, a POH inserter 77, a VT pointer changer 78, POH inserters 79E and 79W, and PDI-P code generators 80E and 80W.

Each of the VT pointer changers 71E and 71W receives a high-order main signal, detects an alarm, and provides the VT path setting unit 72E (72W) with the alarm and main signal. Each of the VT path setting units 72E and 72W sets a path for a dropped VT signal and transfers the VT signal and alarm to the VT path protection switch 73. A VT signal not dropped, an alarm signal, and a VT signal from the low-order VT pointer changer 78 are supplied to the VT path setting unit 72E (72W), which sets a path for them and transfers them to the POH inserter 79E (79W) that inserts a path overhead (POH). Similar to the VT pointer changers 71E and 71W, the VT pointer changer 78 detects an alarm.

The PDI-P code generators 80E and 80W receive alarms from the VT path setting units 72E and 72W and encode the number of paths that caused the alarms for which a PDI-P code is to be prepared. The POH inserter 79E (79W) inserts the PDI-P code into a byte C2 among bytes J1, B3, C2, G1, F2, H4, and Z3 to Z5 in a POH.

In the VT path protection switch 73, the path switch controller 74 receives an alarm from the VT path setting units 72E and 72W and controls the selector 75 to select a normal path. In this way, the VT pointer changer 71E (71W) detects an alarm, if any, out of a main signal, and the VT path setting unit 72E (72W) sets a path for the alarm and main signal.

As a result, the eighth embodiment secures a path and generates a PDI-P code without arranging alarm detectors for the VT path protection switch 75 and PDI-P code generators 76, 80E, and 80W.

FIG. 13 shows an ADM apparatus according to the ninth embodiment of the present invention.

The apparatus has high-order interfaces 81E and 81W, pointer processors 82E and 82W, path setting units 83E and 83W, path protection switches 84 and 85, pointer processors 86E and 86W, an STS interface 87, and low-order interfaces 88E and 88W.

Each of the high-order interfaces 81E and 81W receives a high-order signal. The pointer processors 82E and 82W process STS pointers and detect an STS alarm if any. The pointer processors 82E and 82W provide a timing pulse indicating the start of an STS SPE and a serial alarm, which are supplied to the path setting units 83E and 83W.

The path setting units 83E and 83W provide the path protection switch 84 with main signals for which paths have been set according to path data, and the timing pulse and alarm. The path protection switch 84 selects a normal STS according to the alarm, and provides the STS interface 87 with the normal STS. The STS interface 87 adds an STS pointer to the STS and provides it to the low-order interfaces 88E and 88W, which transmit the STS to a low-order network.

The high-order interface 81E (81W) may receive a high-order signal and set a path for a VT signal. In this case, the pointer processor 82E (82W) detects an STS alarm and a VT alarm, changes a VT pointer, and provides a timing pulse indicating the start of a payload (SPE) of the STS, VT SPE data indicating the position of a payload (SPE) of a VT signal, a timing pulse indicating the start of the VT SPE, and an alarm signal. These signals are supplied to the path setting unit 83E (83W).

The path setting unit 83E (83W) sets a path for the main and data signals and transfers them to the path protection switch 84. For a high-order output, an alarm signal added to a main signal is used to count the number of defective VT channels, and a PDI-P code is generated and inserted accordingly.

The path protection switches 84 and 85 select each a normal path according to an alarm signal. The switches 84 and 85 use a VT SPE and a timing pulse indicating the start of the VT SPE, to monitor the performance of a VT path layer. The path protection switch 84 collectively provides the STS interface 87 with alarm signals used to generate a PDI-P code.

The STS interface 87 generates a PDI-P code according to PDI-P data, inserts the code in a path overhead (POH), adds an STS pointer, and sends the signal to the low-interfaces 88E and 88W.

As explained above, the ADM apparatus of the present invention having path setting units and path protection switches for connecting networks to each other is compact and low cost. The ADM apparatus has a simple structure because it shares data setting and alarm detecting devices.

The embodiments mentioned above do not limit the present invention. Various additions and modifications may be made to the embodiments, to handle various high- and low-order signals.

What is claimed is:

1. An add drop multiplexing (ADM) apparatus connected to first and second double ring networks, comprising:
   path setting means for setting a path for a signal according to path data; and
   path protection means having first and second path protection units for selecting either one of signals on said double ring networks,
   the first path protection unit selecting one of signals dropped from the first double ring network by the path setting means and transmitting the selected signal to the second double ring network, and
   the second path protection unit selecting one of signals from the second double ring network and inserting the selected signal into the path setting means to transmit the selected signal to the first double ring network.

2. The ADM apparatus of claim 1, wherein the path setting means has:
- a first path setter for dropping a low-order signal from a high-order signal according to path data;
- a second path setter for setting a path for a low-order signal according to the path data; and
- a selector for selecting one of the low-order signals provided by the first and second path setters according to selection data contained in the path data.

3. The ADM apparatus of claim 2, wherein the path setting means further has:
- an unequipped signal generator for generating an unequipped signal for an unequipped path according to an unequipped flag contained in the path data.

4. An add drop multiplexing (ADM) apparatus as in claim 1 comprising further:
- a converter for converting an STS (synchronous transport signal) into an STS SPE (synchronous payload envelope);
- said path setting means setting a path for the STS SPE according to path data and inserting or dropping the STS SPE; and
- said path protection means having a selector for receiving STS SPEs dropped by the path setting means, an alarm detector for detecting an alarm, if any, in the STS SPEs, and a controller for controlling the selector according to the detected alarm.

5. An add drop multiplexing (ADM) apparatus as in claim 1 comprising said:
- a converter for converting an STS (synchronous transport signal) into an STS SPE (synchronous payload envelope);
- an alarm detector incorporated in an STS path terminator, for detecting an alarm, if any, in the STS SPE;
- said path setting means setting a path for the STS SPE according to path data, receiving the detected alarm, and inserting or dropping the STS SPE;
- said path protection means having a selector for receiving STS SPEs dropped by the path setting means and a controller for receiving a detected alarm through the path setting means and controlling the selector according to the detected alarm.

6. An add drop multiplexing (ADM) apparatus as in claim 1 comprising further:
- said path setting means receiving, from VT pointer changing means, a VT SPE indication signal, a timing pulse to indicate the start of the VT SPE, and a VT signal, setting a path for the VT signal according to path data, and inserting or dropping the VT signal; and
- said path protection means having VT path performance monitor means for monitoring signals dropped by the path setting means, an alarm detector for detecting an alarm, if any, in the dropped signals, a selector for receiving the dropped signals, and a controller for controlling the selector according to the detected alarm.

7. An add drop multiplexing (ADM) apparatus as in claim 1 comprising further:
- said path setting means receiving, from VT pointer changing means, an alarm and a VT signal, setting a path for the VT signal according to path data, and inserting or dropping the VT signal; and
- said path protection means having a selector for receiving VT signals dropped by the path setting means and a controller for controlling the selector according to an alarm detected in the VT signals.

8. An add drop multiplexing (ADP) apparatus as in claim 1, further comprising:
- said path setting means setting a path for a signal according to path data and inserting or dropping the signal to or from a first interface;
- said first path protection unit selecting one of signals dropped by the path setting means and transferring the selected signal to a second interface; and
- said second path protection unit selecting one of signals passed through the second interface so that the selected signal may be inserted by the path setting means.

* * * * *